(12) United States Patent
Honda et al.

(10) Patent No.: US 8,923,694 B2
(45) Date of Patent: Dec. 30, 2014

(54) OPTICAL RECEIVING DEVICE

(71) Applicants: Fujitsu Telecom Networks Limited, Kawasaki-shi, Kanagawa (JP); Fujitsu Limited, Kawasaki-shi, Kanagawa (JP)

(72) Inventors: Toshiki Honda, Kawasaki (JP); Takehiro Fujita, Kawasaki (JP); Yasushi Sugaya, Kawasaki (JP)

(73) Assignees: Fujitsu Telecom Networks Limited, Kanagawa (JP); Fujitsu Limited, Kanagawa (JP)

( * ) Notice: Subject to any disclaimer, the term of this patent is extended or adjusted under 35 U.S.C. 154(b) by 145 days.

(21) Appl. No.: 13/758,840

(22) Filed: Feb. 4, 2013

(65) Prior Publication Data

US 2013/0216219 A1  Aug. 22, 2013

(30) Foreign Application Priority Data

Feb. 22, 2012  (JP) ................................. 2012-036003

(51) Int. Cl.
*H04B 17/00* (2006.01)
*H04B 10/06* (2006.01)
*H04B 10/60* (2013.01)
*H04B 10/69* (2013.01)

(52) U.S. Cl.
CPC .............. *H04B 10/60* (2013.01); *H04B 10/695* (2013.01)
USPC ................. 398/27; 398/34; 398/37; 398/208; 398/209; 398/210

(58) Field of Classification Search
USPC ................................. 398/27, 34, 37, 208–210
See application file for complete search history.

(56) References Cited

U.S. PATENT DOCUMENTS

| | | | |
|---|---|---|---|
| 7,522,848 B2 * | 4/2009 | Schulz ........................... | 398/209 |
| 7,619,813 B2 * | 11/2009 | Maeda et al. ............ | 359/341.42 |
| 8,249,447 B2 * | 8/2012 | Cai et al. ......................... | 398/24 |
| 2004/0253003 A1 * | 12/2004 | Farmer et al. ................. | 398/214 |
| 2013/0241622 A1 * | 9/2013 | Zerbe et al. ................... | 327/323 |

FOREIGN PATENT DOCUMENTS

JP  2006-60640  3/2006

\* cited by examiner

*Primary Examiner* — Dalzid Singh
(74) *Attorney, Agent, or Firm* — Christie, Parker & Hale, LLP

(57) ABSTRACT

An optical receiving device includes: an optical amplifier configured to amplify a wavelength multiplexed optical signal; a demultiplexer configured to demultiplex the amplified wavelength multiplexed signal into optical signals of a plurality of wavelengths; optical receivers configured to regenerate the demultiplexed optical signals; error correction units configured to correct a bit error in the regenerated optical signals; and main control unit. The control unit adjusts RXDTV of the optical receiver for receiving optical signals of a given wavelength to the optimal value in the state where the gain of the optical amplifier is lowered from that of a normal operation such that the occurrence of bit errors in the optical signals of the other wavelengths does not exceed the correction capability of the error correction unit.

12 Claims, 9 Drawing Sheets

OPTICAL RECEIVING DEVICE

CROSS-REFERENCE TO RELATED APPLICATION

This application claims priority to and the benefit of Japanese Patent Application Number 2012-036003, filed on Feb. 22, 2012, the entire disclosure of which is incorporated herein by reference.

BACKGROUND OF THE INVENTION

1. Field of the Invention

The present invention relates to an optical receiving device adapted to receive an optical signal and, more particularly, to an optical receiving device adapted to receive a wavelength multiplexed optical signal.

2. Description of the Related Art

Conventionally, 1 Gbps or 2.4 Gbps optical receiving devices have been most common. Technological advances have now resulted in successive announcements of novel technologies for 100 Gbps devices and the transmission rate of optical communication devices has been increased accordingly. There is also a high demand for miniaturization of devices as well as improvements in transmission rate. Small-sized optical transceivers such as XFP or SFP have rapidly become popular in place of 300pinMSA that has been in the main stream conventionally. In order to fully exploit the capabilities of small-sized and high-speed optical transceivers, the devices need be adjusted optimally. One of the parameters required to be adjusted is receiver decision threshold voltage (RXDTV).

RXDTV defines a threshold level for distinction between "0" and "1" of received signals. RXDTV need be maintained at an optimal level in order to take the maximum advantage of the specification of an optical receiver defined in Multi-Source Agreements standards.

FIG. 1 is a graph showing the relationship between RXDTV and the error rate. As shown in FIG. 1, as RXDTV is changed, the error rate is changed accordingly. The optimal value of RXDTV varies depending on individual optical receivers. The value of RXDTV occurring when the error rate is at minimum is the optimal value. It should also be noted that RXDTV is affected by the condition of a transmission line. FIG. 2 is a graph showing an exemplary relationship between the cumulative amount of dispersion in optical fiber transmission and the optimal value of RXDTV. The eye opening of an optical signal is distorted due to the impact from dispersion so that the optimal value of RXDTV varies. RXDTV also varies depending on the temperature, optical input level, and wavelength. It is therefore desired to control RXDTV at the optimal value in an optical receiver.

Methods of controlling RXDTV to the optimal value are known in the related art. For example, in one known method (cited document 1), RXDTV of an optical receiver is controlled to the optimal value after superimposing a non-modulated light on an optical signal transmitted over a long distance.

[patent document 1] JP2006-60640

However, no methods have been proposed that are adapted for an optical receiving device for receiving a wavelength multiplexed optical signal in which optical signals of a plurality of wavelengths are multiplexed and that are capable of suitably adjusting RXDTV of optical receivers for receiving respective optical signals.

SUMMARY OF THE INVENTION

The present invention addresses this background and a purpose thereof is to provide a technology adapted for an optical receiving device for receiving a wavelength multiplexed signal and capable of suitably adjusting RXDTV of optical receivers for receiving respective optical signals.

In order to address the challenge, the optical receiving device according to at least one embodiment of the present invention comprises: an optical amplifier configured to amplify a wavelength multiplexed optical signal; a demultiplexer configured to demultiplex the amplified wavelength multiplexed signal so as to branch into optical signals of a plurality of wavelengths; optical receivers configured to regenerate the demultiplexed optical signals; error correction units configured to correct a bit error in the regenerated optical signals; control unit configured to monitor occurrence of bit errors in the optical signals and adjust a gain of the optical amplifier and a receiver decision threshold of the optical receiver. The control unit adjusts the receiver decision threshold of the optical receiver for receiving optical signals of a given wavelength to the optimal value in the state where the gain of the optical amplifier is lowered from that of a normal operation such that the occurrence of bit errors in the optical signals of the other wavelengths does not exceed the correction capability of the error correction unit.

Another embodiment of the present invention also relates to an optical receiving device. The optical receiving device comprises: an optical amplifier configured to amplify a wavelength multiplexed optical signal; a variable optical attenuator provided in front of or behind the optical amplifier; a demultiplexer configured to demultiplex the amplified wavelength multiplexed signal into optical signals of a plurality of wavelengths; optical receivers configured to regenerate the demultiplexed optical signals; error correction units configured to correct a bit error in the regenerated optical signals; and control unit configured to monitor occurrence of bit errors in the optical signals and adjust an attenuation of the variable optical attenuator and a receiver decision threshold of the optical receiver. The control unit adjusts the receiver decision threshold of the optical receiver for receiving optical signals of a given wavelength to the optimal value in the state where the attenuation of the variable optical attenuator is increased from that of a normal operation such that the occurrence of bit errors in the optical signals of the other wavelengths does not exceed the correction capability of the error correction unit.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will be given of an embodiment of the present invention with reference to the drawings.

Figure 1:
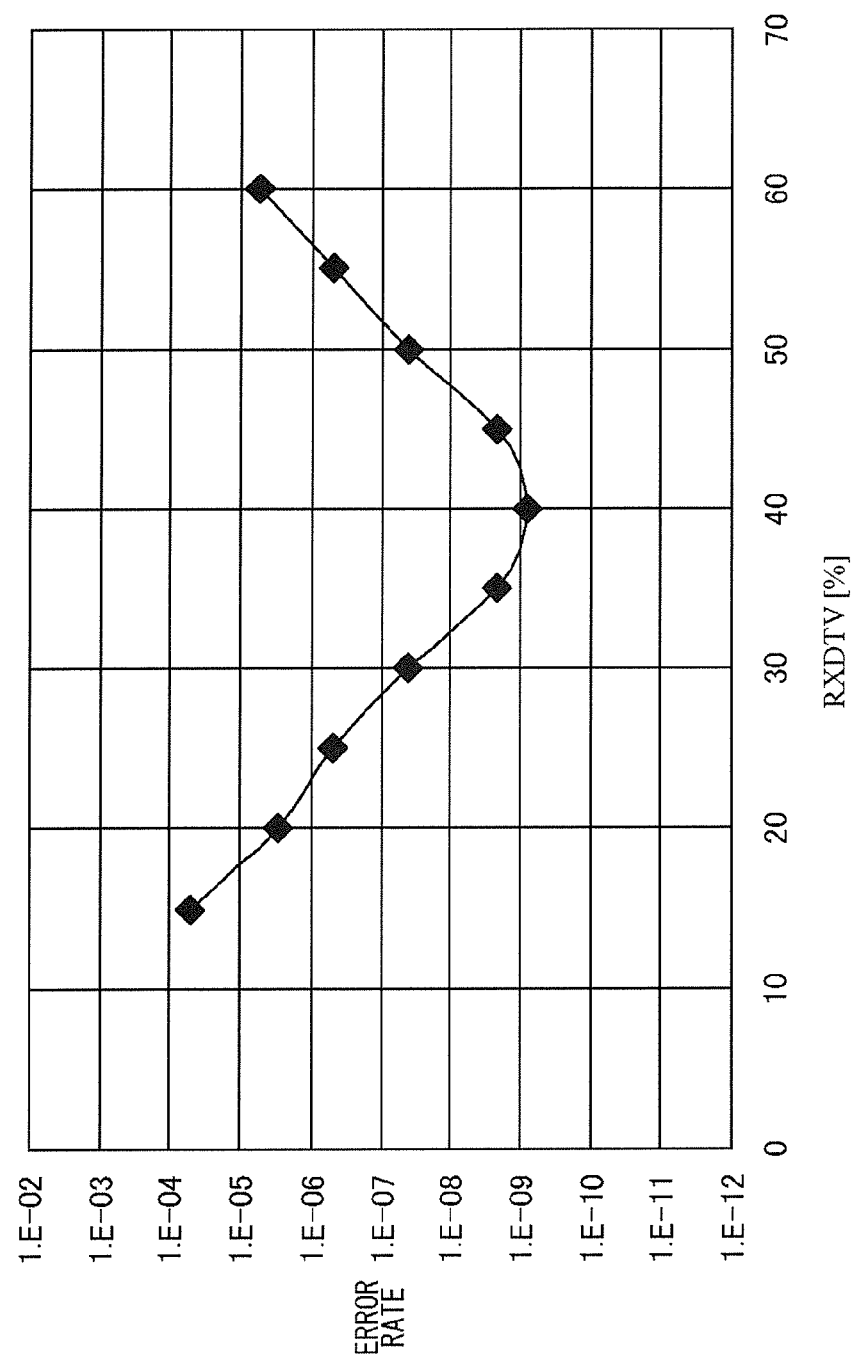
FIG. 1 is a graph showing the relationship between RXDTV and the error rate.
Figure 3:
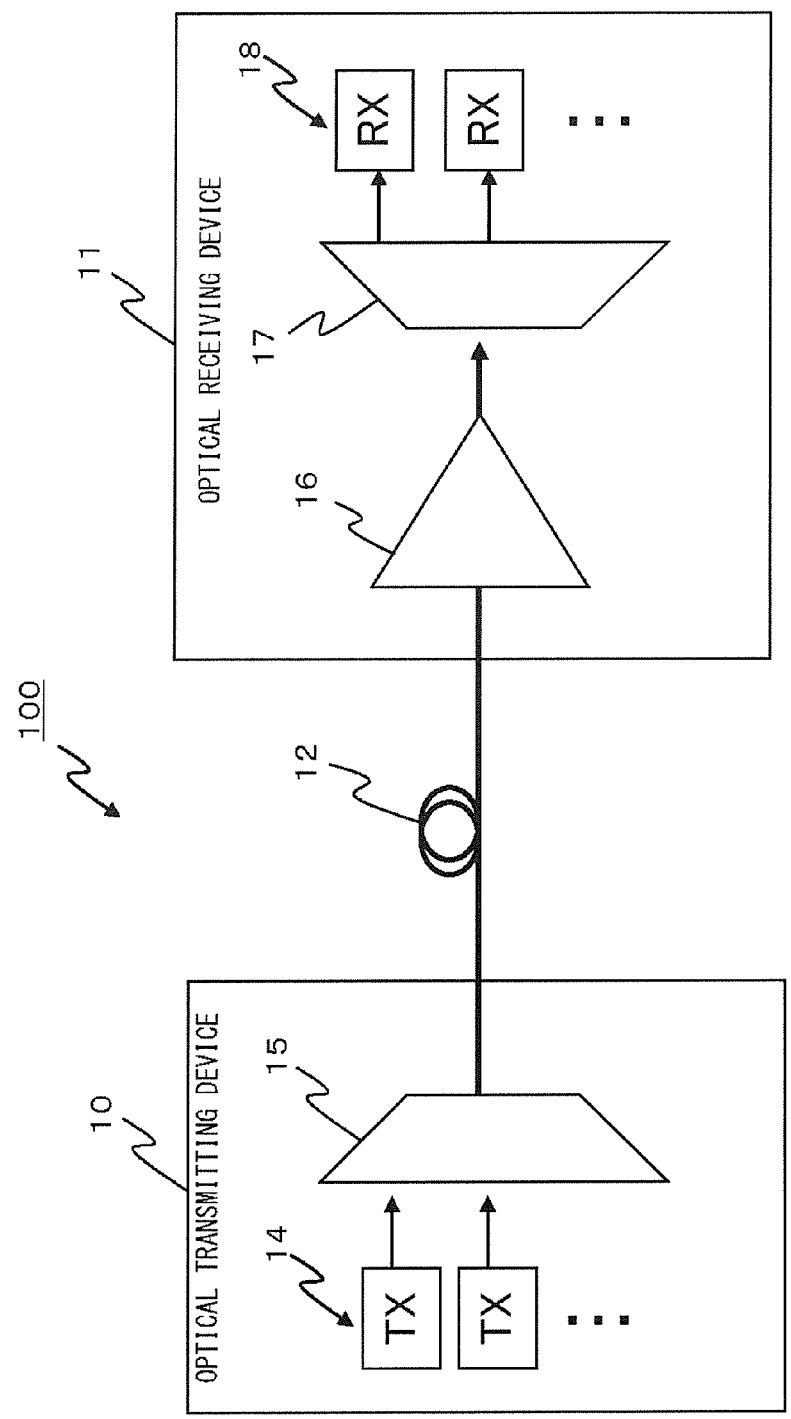
FIG. 3 shows the configuration of an optical transmission device according to the embodiment of the present invention.

FIG. 3 shows the configuration of an optical transmission device according to the embodiment of the present invention. The optical transmission device 100 shown in FIG. 1 is a wavelength division multiplexing (WDM) optical transmission device and comprises an optical transmitting device 10, an optical receiving device 11, and an optical transmission line 12.

The optical transmitting device 10 comprises n (n is an integer equal to or greater than 2) optical transmitters 14 and a multiplexer 15. The optical transmitters 14 output optical signals of wavelengths $\lambda 1$-$\lambda n$. Each optical transmitter 14 has the function of appending a Forward Error Correction (FEC) code to an output optical signal as an error correction code. The multiplexer 15 multiplexes the optical signals of wavelengths $\lambda 1$-$\lambda n$ from the optical transmitters 14, generates a wavelength multiplexed optical signal, and outputs the wavelength multiplexed optical signal to the optical transmission line 12. A single mode fiber is suitably used in the optical transmission line 12.

The optical receiving device 11 comprises an optical amplifier 16, a demultiplexer 17, and n optical receivers 18. The optical amplifier 16 amplifies en bloc the wavelength multiplexed signal attenuated as a result of propagation over the optical transmission line 12. The demultiplexer 17 demultiplexes the wavelength multiplexed signal amplified by the optical amplifier 16 into optical signals of wavelengths $\lambda 1$-$\lambda n$. The optical receivers 18 convert the respective optical signals demultiplexed by the demultiplexer 17 into electrical signals and subjects the signals to a predetermined signal process.

Figure 4:
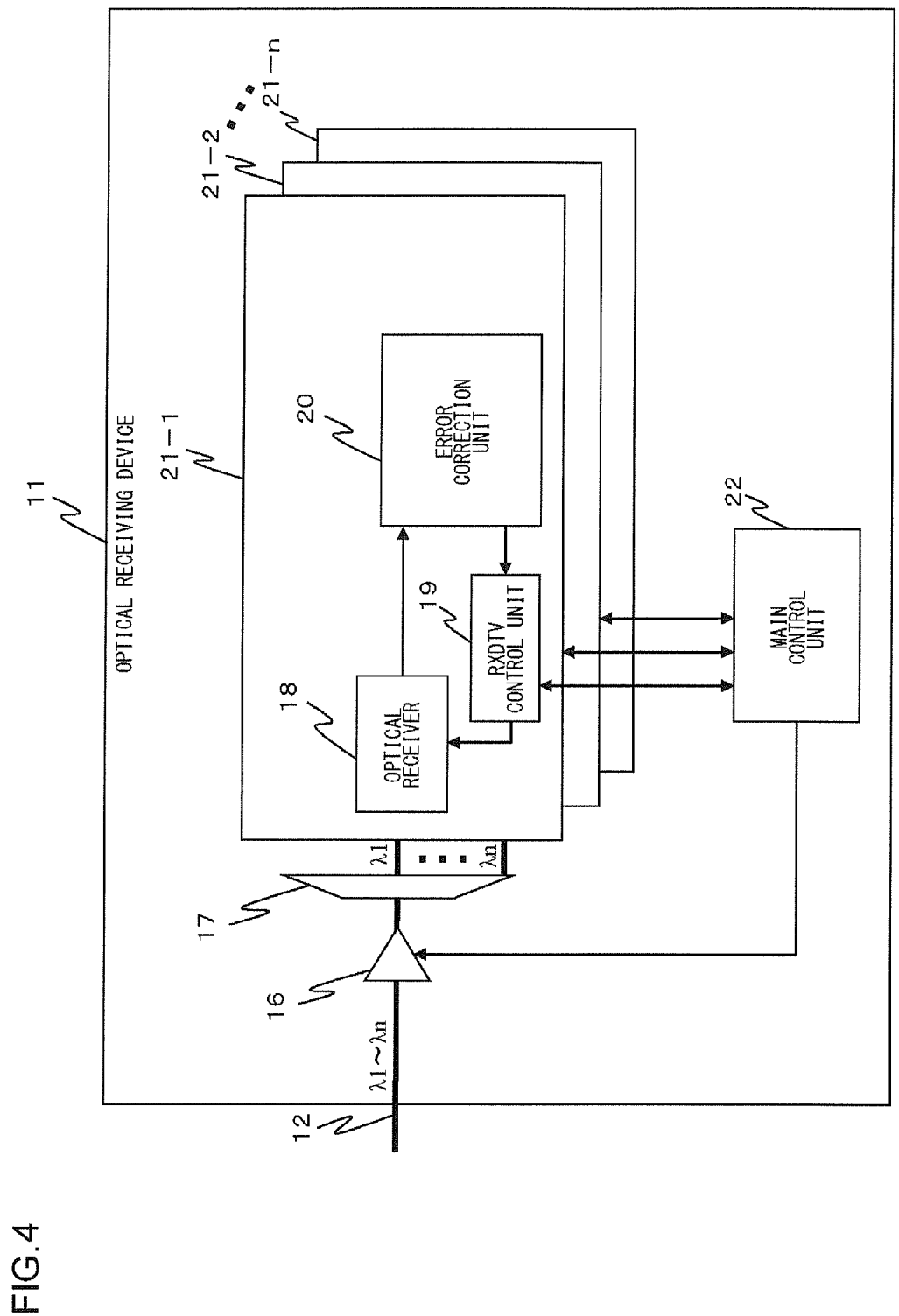
FIG. 4 shows the configuration of the optical receiving device according to the embodiment in further detail.

FIG. 4 shows the configuration of the optical receiving device according to the embodiment in further detail. As shown in FIG. 4, the optical receiving device 11 comprises the optical amplifier 16, the demultiplexer 17, n line cards 21-1-21-$n$, and a main control unit 22.

The wavelength multiplexed signal input from the optical transmission line 12 is amplified by the optical amplifier 16 and then demultiplexed by the demultiplexer 17 according to the wavelength. In this embodiment, n optical signals are generated by the optical amplifier 16. The optical receiving device 11 is provided with as many line cards as the number of wavelengths n of the optical signals output from the demultiplexer 17. Each of the line cards 21-1-21-$n$ comprises an optical receiver 18, an error correction unit 20, and an RXDTV control unit 19.

The optical receiver 18 is provided with a photodetector for receiving the optical signal from the demultiplexer 17 and converting the optical signal into an electrical signal, a timing extraction circuit for extracting a clock signal from the electrical signal, and a regeneration circuit for regenerating the electrical signal using the clock signal. The optical receiver 18 may be a small-sized optical transceiver such as a 10 Gigabit Small Form Factor Pluggable (XFP) transceiver or a Small Form factor Pluggable (SFP) transceiver. The electrical signal output from the optical receiver 18 (hereinafter, referred to as "received data signal") is input to the error correction unit 20.

The error correction unit 20 subjects the received data signal to a bit error correction process, based on the FEC code appended to the input received data signal. When the error correction unit 20 subjects the received data signal to bit error correction, the error correction unit 20 counts the number of error corrections and communicates the number to the RXDTV control unit 19.

The RXDTV control unit 19 controls RXDTV used by the optical receiver 18 to regenerate the electrical signal to the optimal value, based on the number of error corrections reported by the error correction unit 20. More specifically, the RXDTV control unit 19 searches for the value of RXDTV that minimizes the number of error corrections reported by the error correction unit 20 and sets RXDTV to that value. Further, the RXDTV control unit 19 forwards the number of error corrections received from the error correction unit 20 to the main control unit 22.

The main control unit 22 receives the number of error corrections from the RXDTV control units 19 of the line cards 21-1-21-$n$. In other words, the main control unit 22 monitors the number of error corrections in the optical signals of all wavelengths $\lambda 1$-$\lambda n$ demultiplexed by the demultiplexer 17. According to the embodiment, the main control unit 22 is configured to adjust the gain of the optical amplifier 16, based on the information on the number of error corrections from the RXDTV control units 19. Further, the main control unit 22 is configured to direct the RXDTV control unit 19 of the line cards to adjust RXDTV to the optimal value.

Figure 5:
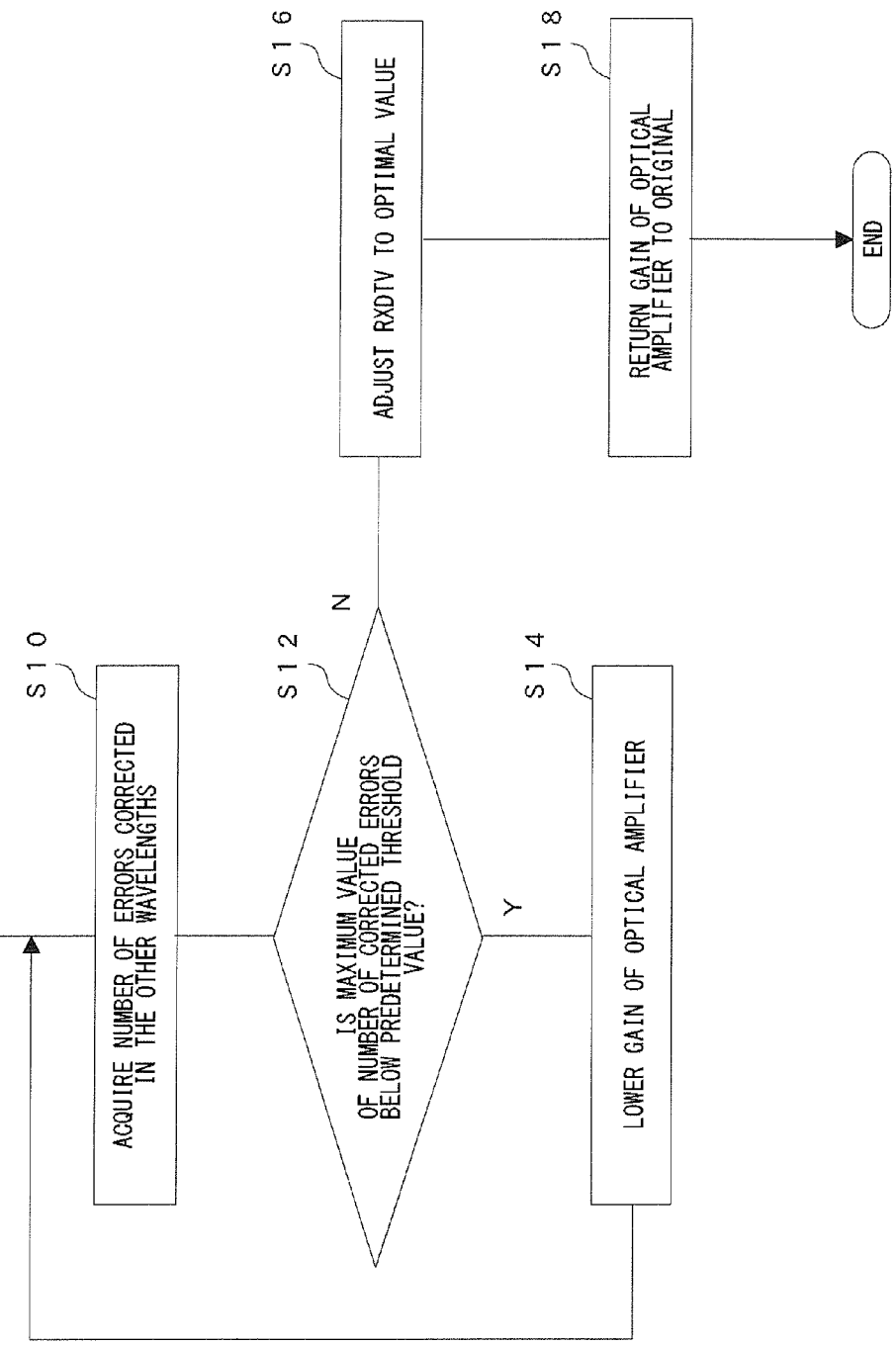
FIG. 5 is a flowchart illustrating the operation of the optical receiving device according to the embodiment.

FIG. 5 is a flowchart illustrating the operation of the optical receiving device 11 according to the embodiment. The steps shown in the flowchart shown in FIG. 5 are executed when the line card is turned on. By way of example, a description will be given of the steps performed when the line card 21-1 adapted to receive the optical signal of the wavelength $\lambda 1$ is turned on. It will be assumed that the other line cards 21-2-21-$n$ adapted to receive the optical signals of the other wavelengths $\lambda 2$-$\lambda n$ are in normal operation, i.e., in an in-service state in which main signals pass through the cards, when the line card 21-1 is turned on.

When the line card 21-1 is turned on, the optical receiver 18, the RXDTV control unit 19, the error correction unit 20 are turned on, and adjustment of RXDTV is started. The main control unit 22 initially acquires the number of error corrections in the optical signals of the wavelengths $\lambda 2$-$\lambda n$ in a predetermined period of time (e.g., one second) from the line cards 21-2-21-$n$ (S10). By acquiring the number of error corrections, the occurrence of bit errors at the wavelengths $\lambda 2$-$\lambda n$ can be monitored.

Subsequently, the main control unit 22 determines whether the maximum value of the number of error corrections thus acquired is below a predetermined threshold value (S12). The threshold value is determined by allowing for the error correction capability of the error correction unit 20. For example, it will be assumed that the error correction unit 20 has the correction capability of reducing the bit error rate of $1 \times 10^{-3}$ to the bit error rate of $1 \times 10^{-12}$ or below. The bit error rate of $1 \times 10^{-3}$ indicates a status in which 10 million bit errors occur per second given that the transmission rate is 10 Gbps. In this case, the threshold value is set to, for example, a value smaller than 10 million (e.g., 0.1 million).

If the maximum value of the number of error corrections is below the predetermined threshold value (Y in S12), the main control unit 22 lowers the gain of the optical amplifier 16. For example, if the gain of the optical amplifier 16 is lowered by 3 dB, the bit error rate will be increased accordingly because the optical signals of the wavelengths $\lambda 2$-$\lambda n$ will be lost in the white noise generated in the optical amplifier 16, so that the number of error corrections by the error correction unit 20 is increased. Control is then returned to S10, whereupon the number of error corrections at the wavelengths $\lambda 2$-$\lambda n$ is acquired and the threshold value and the maximum value of the number of error corrections are compared again (S12).

By repeating the steps of S10-S14, the gain of the optical amplifier 16 can be lowered from that of a normal operation such that the bit error rate of the optical signals of the wavelengths $\lambda 2$-$\lambda n$ does not exceed the correction capability ($1 \times 10^{-3}$) of the error correction unit 20. In other words, the optical signals of the wavelengths $\lambda 2$-$\lambda n$ can be corrected such that the bit error rate is $1 \times 10^{-12}$ or below, which can be considered as an error-free level, even if the gain of the optical amplifier 16 is lowered from that of a normal operation. Therefore, the optical signals of the wavelengths $\lambda 2$-$\lambda n$ in service are not affected by the drop in the gain. If the gain of the optical amplifier 16 is lowered in too large a step in S14, the bit error rate of the optical signals of the wavelengths $\lambda 2$-$\lambda n$ will rapidly become poor to a level that the correction capability of the error correction unit 20 is exceeded. Meanwhile, if the gain is lowered in too small a step in S14, the time required to lower the gain of the optical amplifier 16 will be increased accordingly. It is therefore desirable that the step in which the gain is lowered in S14 be defined within an appropriate range in consideration of the above.

Meanwhile, if the maximum value of the number of error corrections is equal to or more than the predetermined threshold value (N in S12), the main control unit 22 adjusts RXDTV of the optical receiver 18 of the line card 21-1 to the optimal value (S16). RXDTV varies in the range 0%-100%, in which is found a turning point in the bit error rate as shown in FIG. 1. The main control unit 22 defines RXDTV at several different values so as to identify a point where the number of error corrections is at minimum.

The advantage of lowering the gain of the optical amplifier 16 will be appreciated in the process of searching for the optimal value of RXDTV. For example, degradation of the bit error rate of a signal of 10 Gbps from $1 \times 10^{-12}$ to $1 \times 10^{-9}$ results in an increase in error corrections from once in 100 second to once in 100 milliseconds. Therefore, the time required to detect a error correction is reduced by 1/1000 so that the time required to monitor the number of error corrections is dramatically reduced. If the time to monitor the number of error corrections is too short in comparison with the frequency of error corrections, RXDTV may be set to a value deviated from the true optimal value. According to the embodiment, a sufficiently large number of error corrections can be acquired in a short monitoring time so that the disadvantage is overcome.

Once RXDTV is adjusted to the optimal value in S16, the main control unit 22 returns the gain of the optical amplifier 16 to the initial gain (S18). This completes the adjustment of RXDTV performed when the line card 21-1 is turned on.

Described above is adjustment of RXDTV to the optimal value performed when a line card is turned on. The main control unit 22 may successively adjust RXDTV of the optical receivers 18 of the line cards 21-1-21-$n$ to the optimal value while the optical receiving device 11 is in normal operation. The optimal value of RXDTV is affected by changes in the external environment such as temperature or input optical level. Therefore, merely optimizing RXDTV at the time of turning the line card on may not be sufficient. It may be necessary to readjust RXDTV while the device is in operation. Controlling of RXDTV to the optimal value during the normal operation of the device is similar to the control described with reference to the flowchart of FIG. 5. In the absence of a sufficient number of error corrections in optical signals in normal operation, one of the optical signals in operation in which the number of error corrections is at maximum may be identified. By lowering the gain of the optical amplifier 16 accordingly, RXDTV of the optical signals can be readjusted without interrupting the service.

Figure 2:
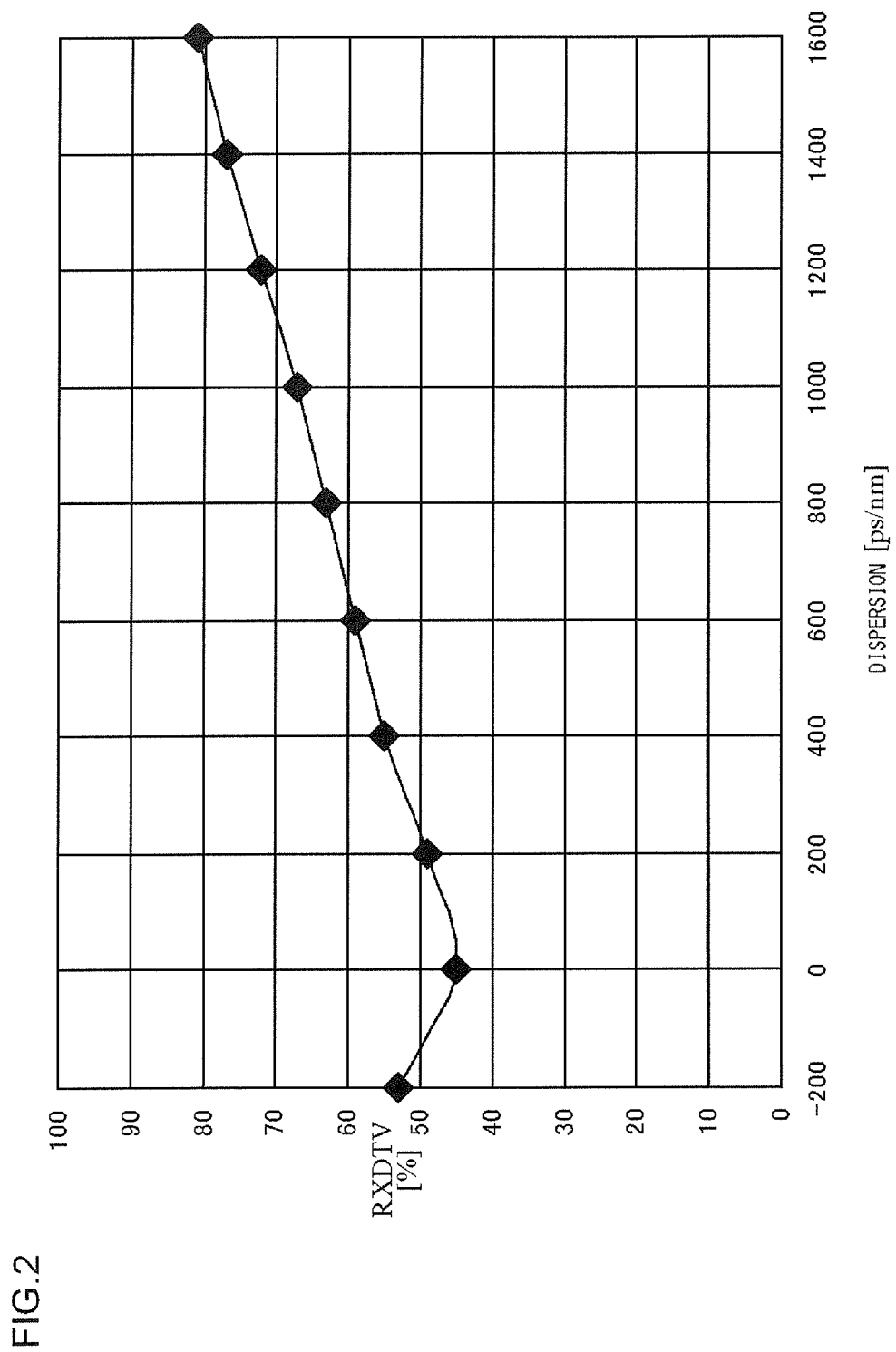
FIG. 2 is a graph showing an exemplary relationship between the cumulative amount of dispersion in optical fiber transmission and the optimal value of RXDTV.
Figure 6:
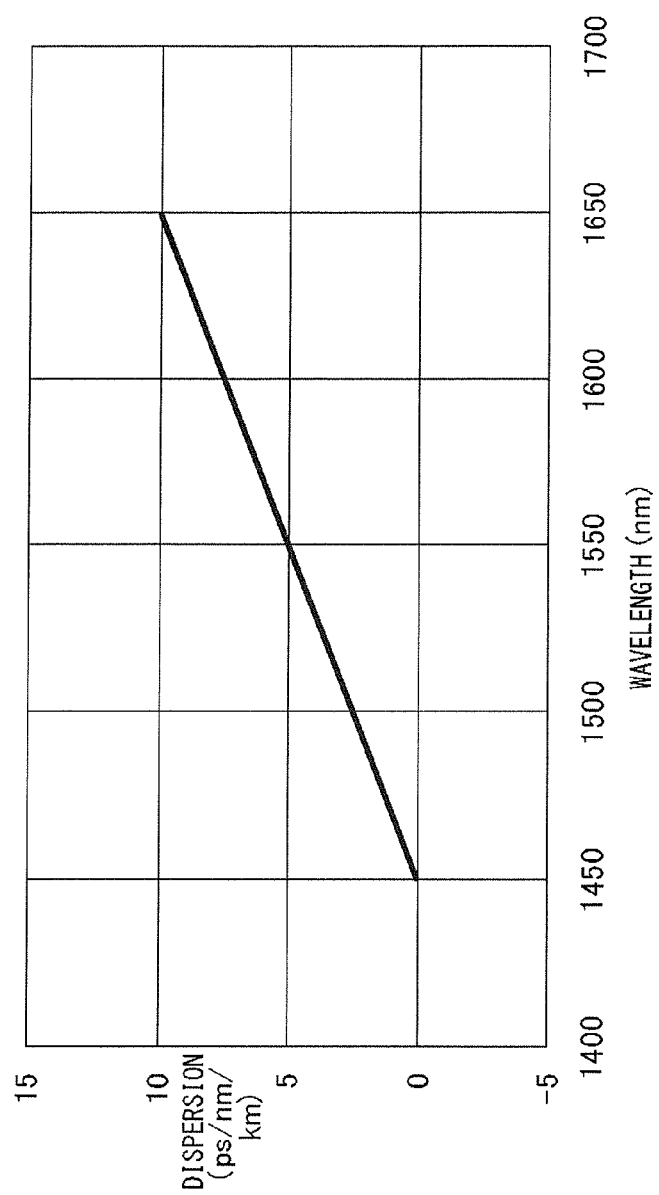
FIG. 6 shows an exemplary relationship between wavelength and dispersion in an optical fiber.

As described with reference to FIG. 2, the optimal value of RXDTV and the amount of dispersion are correlated. In other words, if the optimal value for a given amount of dispersion is known, that value may be used as an initial value. FIG. 6 shows an exemplary relationship between wavelength and dispersion in an optical fiber. The relationship shown in FIG. 6 gives an estimation of a difference in the amount of dispersion between any wavelengths. For example, given that the amount of dispersion incurred when a signal of the wavelength of 1532 nm is transmitted over a distance of 80 km is 1294 ps/nm, the amount of dispersion at the wavelength of 1552 nm is calculated as 1374 ps/nm. Further, taking the graph of FIG. 2 as an example, the relationship between the optimal value of RXDTV and the amount of dispersion will be given by optimal value of RXDTV [%]=0.028 [%/(ps/nm)]×amount of dispersion [ps/nm]. Therefore, the optimal value of RXDTV can be estimated once the difference in the amount of dispersion between wavelengths is known. In the above-mentioned example, given that the optimal value of RXDTV of an optical signal of the wavelength 1532 nm is 50%, the optimal value of RXDTV of an optical signal at the wavelength 1374 nm will be estimated to be 52.24% by adding 50% to 2.24%=0.028×(1374−1294).

Figure 7:
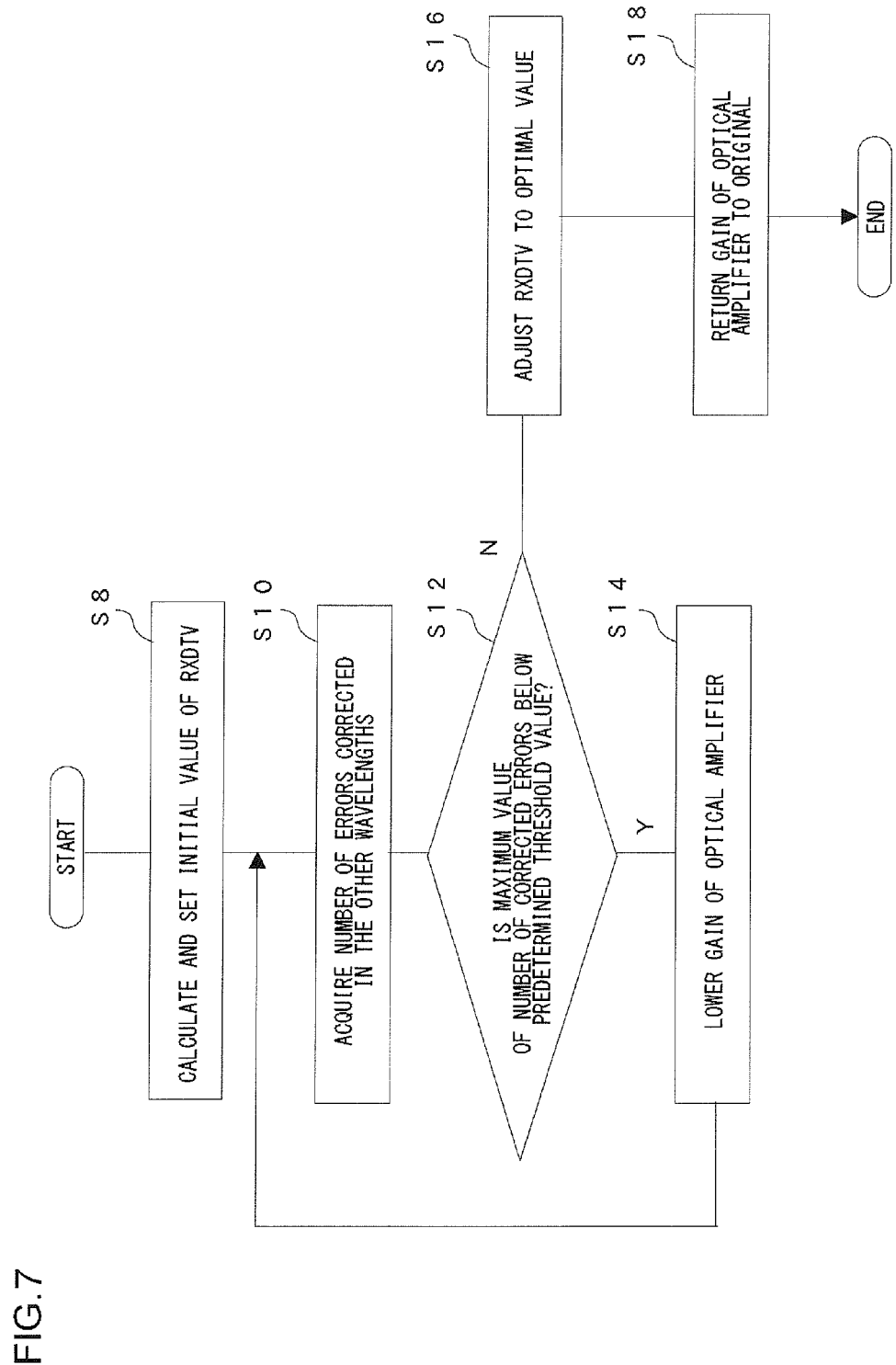
FIG. 7 is a flowchart showing another operation of the optical receiving device according to the embodiment.

FIG. 7 is a flowchart showing another operation of the optical receiving device 11 according to the embodiment. According to the flowchart of FIG. 5, when a line card for receiving optical signals at a given wavelength is turned on, the main control unit 22 only identifies the number of error corrections in the optical signals of the other wavelengths. According to the flowchart, the main control unit 22 also identifies RXDTV of the optical receiver of the other line cards adjusted at the optimal value. The main control unit 22 uses the above-noted relationship between the optimal value of RXDTV and the amount of dispersion so as to calculate the optimal value of RXDTV that should be identified by a search, and uses the optimal value thus identified as the initial value of a search (S8). By referring to RXDTV of other optical receiver adjusted to the optimal value and calculating and setting the initial value for a search for the optimal value before searching for the optimal value of RXDTV of a given optical receiver, the range of search can be narrowed. Accordingly, the speed of search for the optimal value of RXDTV is increased. In the flowchart of FIG. 7, S8 is provided to precede S10. Alternatively, S8 may be provided anywhere so long as it precedes S16 for adjustment of RXDTV to the optimal value.

As described above, the optical receiving device 11 according to the embodiment is configured to adjust RXDTV of the optical receiver 18 for receiving optical signals of a given wavelength to the optimal value in the state where the gain of the optical amplifier 16 is lowered from that of a normal operation such that the occurrence of bit errors in the optical signals of the other wavelengths does not exceed the correction capability of the error correction unit 20. In this way, RXDTV of the optical receiver 18 subject to adjustment can be adjusted to the optimal value while the optical signals of the other wavelengths remain in service. Further, since the frequency of occurrence of bit errors is increased by lowering the gain of the optical amplifier 16, the optimal value of RXDTV can be identified by a search in a short period of time and more accurately.

Figure 8:
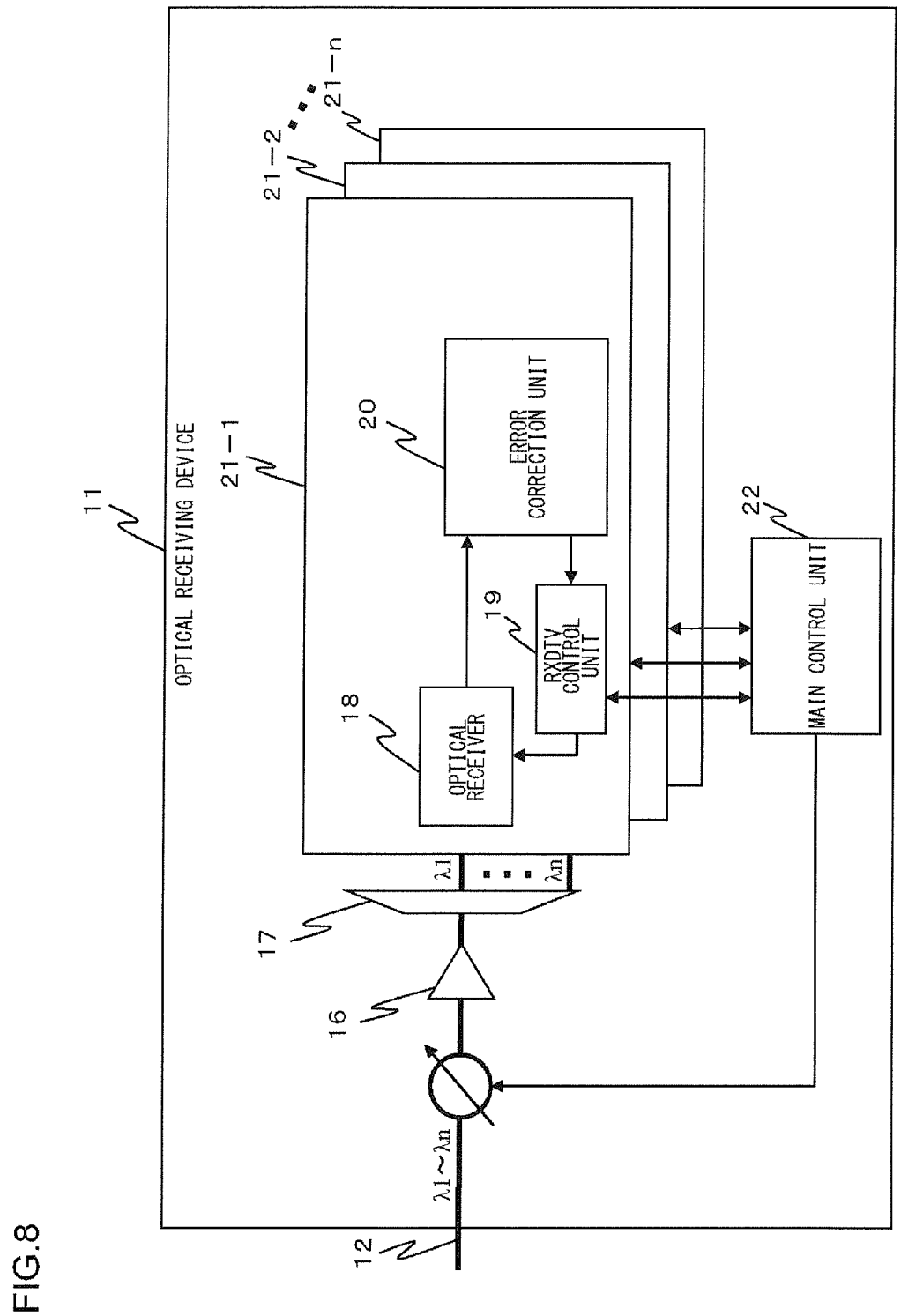
FIG. 8 shows the configuration of the optical receiving device according to another embodiment of the present invention.

FIG. 8 shows the configuration of the optical receiving device 11 according to another embodiment of the present invention. The optical receiving device 11 shown in FIG. 8 differs from the optical receiving device shown in FIG. 3 in that a variable optical attenuator (VOA) 40 is provided in front of the optical amplifier 16. The main control unit 22 controls the attenuation provided by the variable optical attenuator 40 in accordance with information on the number of error corrections from the RXDTV control unit 19. The other constituting elements such as line cards are similar to those of the optical receiving device shown in FIG. 3 so that a detailed description thereof is omitted.

Figure 9:
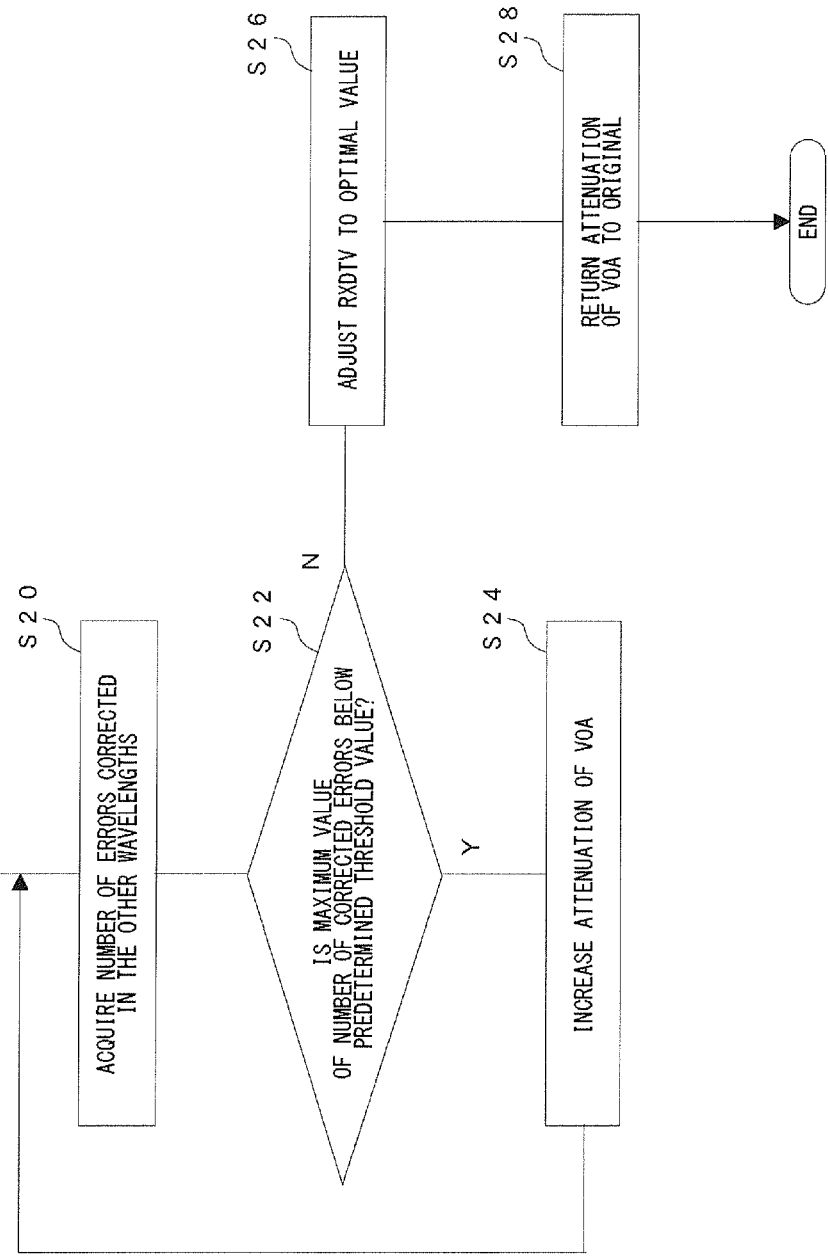
FIG. 9 is a flowchart illustrating the operation of the optical receiving device according to another embodiment of the present invention.

FIG. 9 is a flowchart illustrating the operation of the optical receiving device 11 according to another embodiment of the present invention. The steps in the flowchart shown in FIG. 9 are executed at the time of turning a line card on or during a normal operation of the optical receiving device 11. A description will be given of adjustment of RXDTV in the optical receiver 18 in the line card 21-1 for receiving optical signals of the wavelength λ1.

The main control unit 22 initially acquires the number of error corrections in the optical signals of the wavelengths λ2-λn in a predetermined period of time (e.g., one second) from the line cards 21-2-21-*n* (S20). By acquiring the number of error corrections, the occurrence of bit errors at the wavelengths λ2-λn can be monitored.

Subsequently, the main control unit 22 determines whether the maximum value of the number of error corrections thus acquired is below a predetermined threshold value (S22). If the maximum value of the number of error corrections is below the predetermined threshold value (Y in S22), the main control unit 22 increases the attenuation of the variable optical attenuator 40. This results in an increase in the bit error rate of the optical signals of the wavelengths λ2-λn due to degradation in the optical signal-to-noise ratio and in an increase in the number of error corrections by the error correction unit 20. Control is then returned to S20, whereupon the number of error corrections at the wavelengths λ2-λn is acquired and the threshold value and the maximum value of the number of error corrections are compared (S22).

By repeating the steps of S20-S24, the attenuation of the variable optical attenuator 40 can be increased from that of a normal operation such that the bit error rate of the optical signals of the wavelengths λ2-λn does not exceed the correction capability of the error correction unit 20. If the attenuation of the variable optical attenuator 40 is increased in too large a step in S24, the bit error rate of the optical signals of the wavelengths λ2-λn will rapidly become poor to a level that the correction capability of the error correction unit 20 is exceeded. Meanwhile, if the attenuation is increased in too small a step in S24, the time required to increase the attenuation of the variable optical attenuator 40 will be increased accordingly. It is therefore desirable that the step in which the attenuation is increased in S24 be defined within an appropriate range in consideration of the above.

Meanwhile, if the maximum value of the number of error corrections is equal to or more than the predetermined threshold value (N in S22), the main control unit 22 adjusts RXDTV of the optical receiver 18 of the line card 21-1 to the optimal value (S26). The advantage of increasing the attenuation of the variable optical attenuator 40 is appreciated in searching for the optimal value of RXDTV.

Once RXDTV is adjusted to the optimal value in S26, the main control unit 22 returns the attenuation of the variable optical attenuator 40 to the initial level (S28). This completes the adjustment of RXDTV in the optical receiver 18 performed when the line card 21-1 is turned on.

The variable optical attenuator 40 according to the embodiment shown in FIG. 8 is provided in front of the optical amplifier 16. Alternatively, the variable optical attenuator 40 may be provided behind the optical amplifier 16. The steps of calculating and setting the initial value for a search for the optimal value as described with reference to FIG. 7 may be added to the steps of the flowchart shown in FIG. 9.

As described above, the optical receiving device 11 according to the embodiment is configured to adjust RXDTV of the optical receiver 18 for receiving optical signals of a given wavelength to the optimal value in the state where the attenuation of the variable optical attenuator 40 is increased from that of a normal operation such that the occurrence of bit errors in the optical signals of the other wavelengths does not exceed the correction capability of the error correction unit 20. In this way, RXDTV of the optical receiver 18 subject to adjustment can be adjusted to the optimal value while the optical signals of the other wavelengths remain in service. Further, since the frequency of occurrence of bit errors is increased by increasing the attenuation of the variable optical attenuator 40, the optimal value of RXDTV can be identified by a search in a short period of time and more accurately.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An optical receiving device comprising:
    an optical amplifier configured to amplify a wavelength multiplexed optical signal;
    a demultiplexer configured to demultiplex the amplified wavelength multiplexed signal into optical signals of a plurality of wavelengths;
    optical receivers configured to regenerate the demultiplexed optical signals;
    error correction units configured to correct a bit error in the regenerated optical signals; and
    control unit configured to monitor occurrence of bit errors in the optical signals and adjust a gain of the optical amplifier and a receiver decision threshold of the optical receiver,
    wherein, the control unit adjusts the receiver decision threshold of the optical receiver for receiving optical signals of a given wavelength to the optimal value in the state where the gain of the optical amplifier is lowered from that of a normal operation such that the occurrence of bit errors in the optical signals of the other wavelengths does not exceed the correction capability of the error correction unit.

2. The optical receiving device according to claim 1, wherein the control unit adjusts the receiver decision threshold so that the number of error corrections in optical signals of the given wavelength is minimized.

3. The optical receiving device according to claim 1, wherein the control unit returns the gain of the optical amplifier to the gain of a normal operation once the receiver decision threshold is adjusted.

4. The optical receiving device according to claim 1,
wherein the control unit searches for the optimal value of the receiver decision threshold of a given optical receiver by referring to the receiver decision threshold of other optical receiver adjusted to the optimal value and setting an initial value for a search accordingly.

5. The optical receiving device according to claim 1,
wherein the control unit adjusts the receiver decision threshold of a given optical receiver to the optimal value when the optical receiver is turned on.

6. The optical receiving device according to claim 1,
wherein the control unit successively adjusts the receiver decision threshold of the optical receivers to the optimal value while the optical receiving device is in normal operation.

7. An optical receiving device comprising:
an optical amplifier configured to amplify a wavelength multiplexed optical signal;
a variable optical attenuator provided in front of or behind the optical amplifier;
a demultiplexer configured to demultiplex the amplified wavelength multiplexed signal into optical signals of a plurality of wavelengths;
optical receivers configured to regenerate the demultiplexed optical signals;
error correction units configured to correct a bit error in the regenerated optical signals; and
control unit configured to monitor occurrence of bit errors in the optical signals and adjust an attenuation of the variable optical attenuator and a receiver decision threshold of the optical receiver,
wherein, the control unit adjusts the receiver decision threshold of the optical receiver for receiving optical signals of a given wavelength to the optimal value in the state where the attenuation of the variable optical attenuator is increased from that of a normal operation such that the occurrence of bit errors in the optical signals of the other wavelengths does not exceed the correction capability of the error correction unit.

8. The optical receiving device according to claim 7,
wherein the control unit adjusts the receiver decision threshold so that the number of error corrections in optical signals of the given wavelength is minimized.

9. The optical receiving device according to claim 7,
wherein the control unit returns the attenuation of the variable optical attenuator to the attenuation of a normal operation once the receiver decision threshold is adjusted.

10. The optical receiving device according to claim 7,
wherein the control unit searches for the optimal value of the receiver decision threshold of a given optical receiver by referring to the receiver decision threshold of other optical receiver adjusted to the optimal value and setting an initial value for a search accordingly.

11. The optical receiving device according to claim 7,
wherein the control unit adjusts the receiver decision threshold of a given optical receiver to the optimal value when the optical receiver is turned on.

12. The optical receiving device according to claim 7,
wherein the control unit successively adjusts the receiver decision threshold of the optical receivers to the optimal value while the optical receiving device is in normal operation.

* * * * *